Dec. 20, 1949 — G. A. COLLENDER — 2,492,126
WALKING BEAM MOUNTING FOR TANDEM AXLES
Filed Nov. 1, 1945 — 3 Sheets-Sheet 1
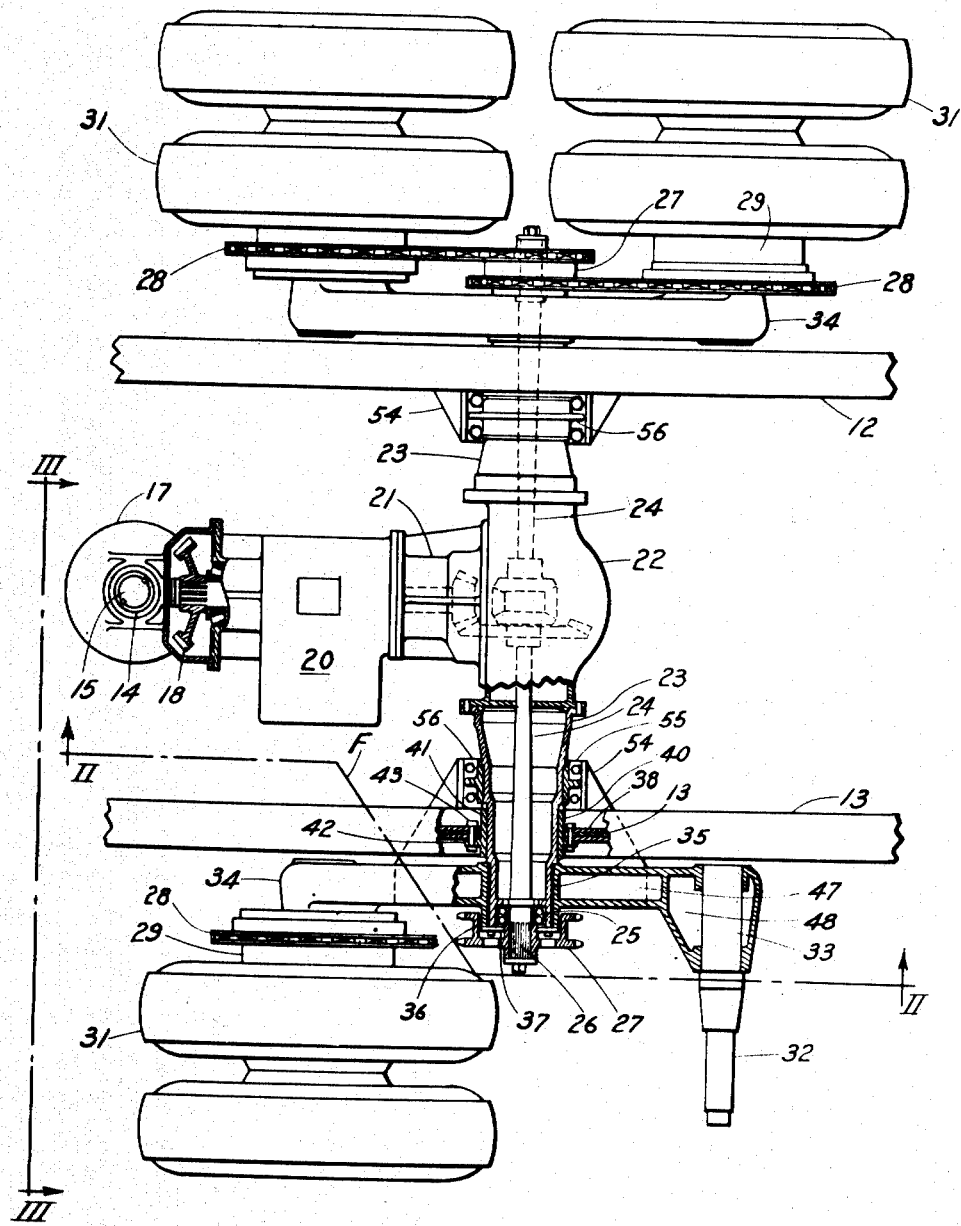
FIG. I
Inventor
GUSTAVE A. COLLENDER
By Ralph L. Stevens
Attorney Dec. 20, 1949     G. A. COLLENDER     2,492,126
WALKING BEAM MOUNTING FOR TANDEM AXLES
Filed Nov. 1, 1945     3 Sheets-Sheet 2
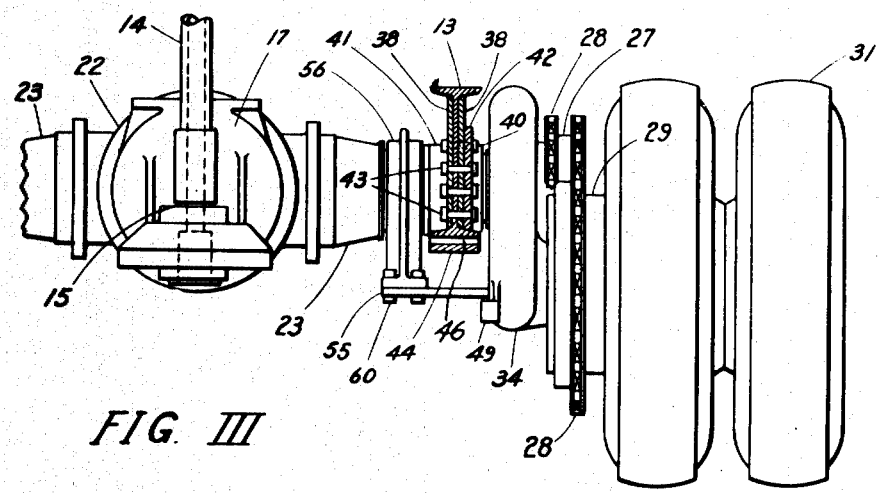
FIG. III
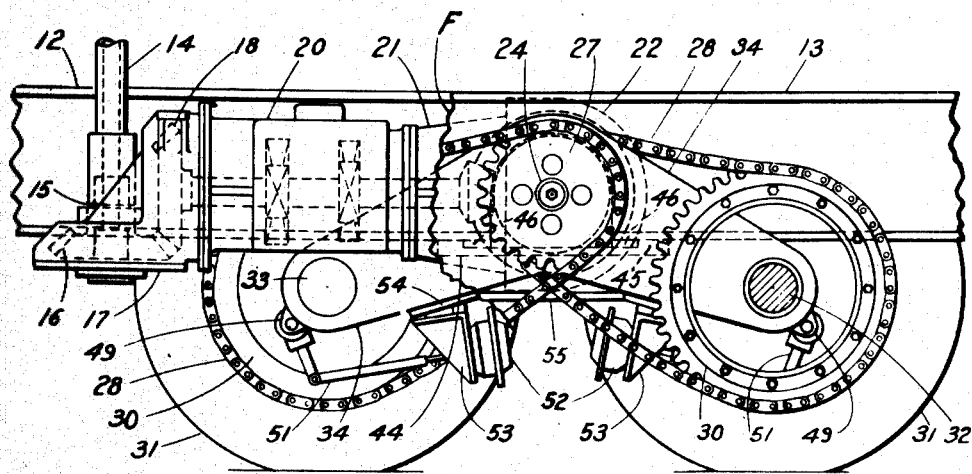
FIG. II
Inventor
GUSTAVE A. COLLENDER
By Ralph L. Stevens
Attorney

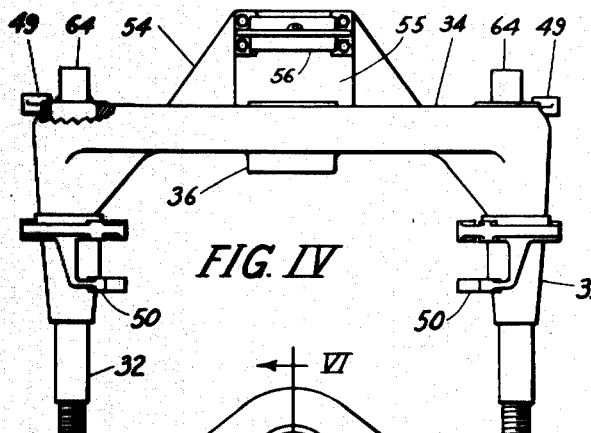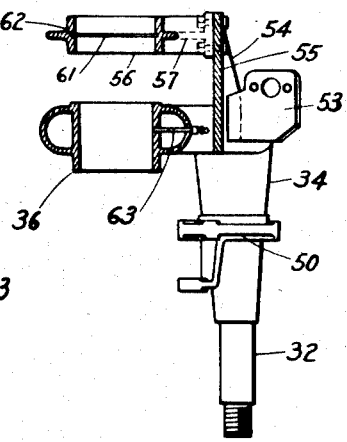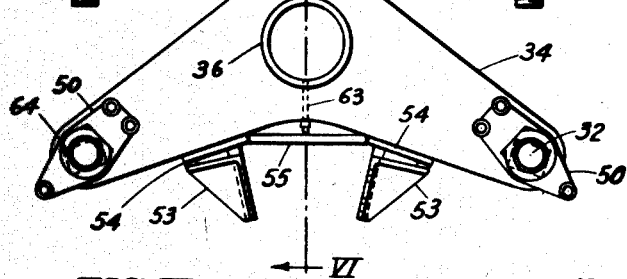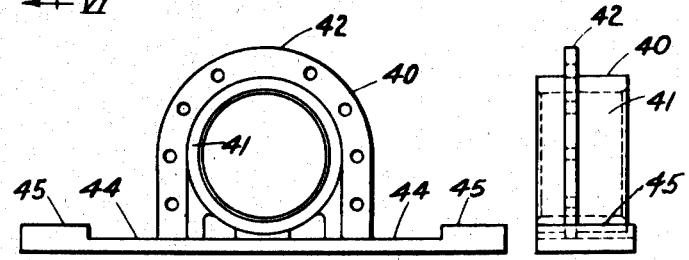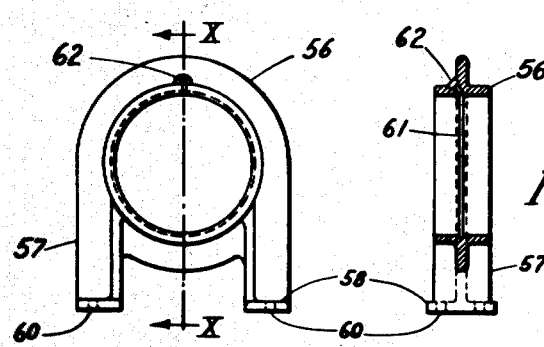

Patented Dec. 20, 1949

2,492,126

UNITED STATES PATENT OFFICE 2,492,126

WALKING BEAM MOUNTING FOR TANDEM AXLES

Gustave A. Collender, Los Angeles, Calif.

Application November 1, 1945, Serial No. 626,025

7 Claims. (Cl. 280—104.5)

This invention relates to suspension means for mounting the chassis framework of a vehicle upon sets of closely spaced tandem wheels.

More particularly the present invention is concerned with improvements in a suspension mechanism of the type embodying a walking beam designed to pivotally support the frame between its ends and carrying laterally extended stub or spindle axles at its ends. In such designs the load is transmitted from the axles to the wheels in zones located well outwardly from the walking beam proper, with the results that powerful forces are exerted tending to twist the beam arms about their axes, and that twisting stresses are set up in the region of the trunnion, causing excessive wear and tending to rupture the pivotal joint.

Accordingly it is the primary object of my invention to devise a walking beam mounting wherein the load is transmitted through two or more spaced bearings from the transverse member, that forms the trunnion, to the walking beam. This preferably is accomplished by straddling each longitudinal frame member with a pair of bearings in such manner that the walking beam arms can oscillate in a vertical plane outward from the frame.

In this connection, it is an object of this invention to project the cross shaft or jack shaft housing, that forms the trunnion member, laterally through the longitudinal frame member and to strongly cradle and reenforce it so that it affords a sturdy beam support at each side of the frame member.

A further important object of the present invention resides in the provision of a new and improved structure for securing the ends of an unsprung axle housing to the side members of a chassis frame.

It is still another major object to devise an improved walking beam for tandem wheeled vehicle units, of the type that is rigid and designed to oscillate about an axis transverse to the vehicle.

It is an object to cast a partially hollow walking beam body from steel or strong alloys, the stub axles preferably being separately formed and secured to the ends of the cast beam.

It is a further object to form a rigid walking beam with a transverse bearing intermediate its ends, and to secure thereto an underslung bracket carrying a second bearing in laterally offset relation to the first bearing.

The foregoing and other important objects of my invention should clearly appear from a study of the following description when taken in conjunction with the accompanying drawings and the appended claims. In the drawings:

Fig. I is a top plan view of the rear end of a chassis embodying the present invention, one dual wheel being removed and several of the other parts being shown in section to simplify the disclosure.

Fig. II is a view taken approximately along the irregular line II—II in Fig. I, which line includes a segment F permitting inboard and outboard disclosure of identical parts in a single view.

Fig. III represents a front elevational view of a major portion of the rear drive unit, taken substantially along the vertical plane of line III—III in Fig. I, but with a portion of the framework and associated parts shown in vertical section.

Fig. IV is a top plan view of my improved walking beam assembly as incorporated in Figs. I to III.

Fig. V is a face or outside elevational view of the assembly of Fig. IV.

Fig. VI represents a section taken upon the plane of line VI—VI, Fig. V.

Fig. VII is an elevational view looking towards the outboard face of one of the jackshaft housing mountings seen in Figs. I and III.

Fig. VIII is a side elevational view of the bracket of Fig. VII.

Fig. IX is an elevational view of one face of one of the inboard bearing brackets for the walking beam.

Fig. X represents a vertical section taken on the plane of line X—X, Fig. IX.

With continued reference to the drawings, and with particular reference first to Fig. I, the chassis framework comprises a pair of longitudinal members 12 and 13, preferably steel I-beams identical in formation but numbered separately to avoid confusion in later discussion. The framework is of course completed by cross members (not shown), and is designed to carry any suitable load. Since this invention is primarily concerned with an undercarriage for heavy cranes, the tractive power is shown as applied downwardly from the crane power plant (not shown) by means of a hollow vertical propeller shaft 14. The lower end of this shaft is keyed to a short shaft 15 which in turn is secured to bevel gear 16, suitable bearings and support for these parts being afforded by a housing unit 17. This housing also carries a bevel gear 18 in mesh with gear 16 and is secured to the power input end of a speed change transmission unit 20. The output end is supported by a casing section 21 that is secured to a conventional axle housing differential bowl 22.

The internal driving mechanism forms no part of the invention and hence is sketchily illustrated. The transmission unit 20 may be two-speed or multi-speed, of any suitable design but preferably comprising internal mechanism such as disclosed in my copending applications, Ser. No. 567,330 filed December 9, 1944 and now abandoned; and Ser. No. 591,286 filed May 1, 1945. These applications also disclose the transmission control mechanisms.

The bowl 22 has rigid extension sleeves 23 of special design to be supported by the frame members 12, 13, the assembly forming a jack shaft housing for axle shafts 24 that are differentially driven in conventional manner. The outer ends of the shafts are journaled in bearings 25 carried by the sleeve ends and are splined at 26 to drive a pair of dual sprocket wheels 27. Two pairs of chains 28 encompass these sprocket wheels and four associated sprocket plates 30, individual to and secured to the brake drums 29 of four dual wheel units 31 to drive the latter.

Each dual wheel 31 is rotatable upon the outer end of a spindle or stub axle 32, suitable bearings and retainers being provided that form no part of this invention. The inner ends 33 of the spindles are enlarged and set tightly into the ends of rigid walking beams 34, the latter being centrally apertured and rotatably mounted upon sleeve bearings 35 that surround the outer ends of the axle housing sleeves 23. The walking beams have cylindrical offset extensions 36, and each is engaged by a circular plate 37 secured to one of the sleeves 23 by cap screws. The plates 37 thus serve to seal and retain the bearings 25, and also to hold the walking beams against outward removal.

As seen in Figs. I and III, the I-beams 12 and 13 are strengthened in the region of the sleeves 23 by relatively heavy plates 38 which snugly fit within their side channels. A member 40 (see also Figs. VII and VIII), one at each side of the frame, has a sleeve 41 which snugly receives a stepped up enlargement of the corresponding end of the axle housing, and a flanged rim 42 which is secured to the plates 38 and the I-beam by through bolts 43. The plates 38, like the I-beam, of course had to be slotted upwardly from their bottom edges to permit the sleeves 23 and 41 to be moved up into the resulting archlike notches.

Each member 40 has a pair of integral wings which extend longitudinally along the bottom of the I-beam to close the slots, and further reenforcement of the weakened section is afforded by thickening the ends of the wings to provide lugs 45 which confine a pair of short plates 46 that are welded to the bottom of the I-beam at opposite sides of the notch. The lugs 45 may be integral with the wings or welded on, and they aid in locking the entire drive unit against fore and aft shifting.

Each walking beam 34, previously described in a general way comprises a main body cast to such shape, with internal chambers 47 and 48 and associated hub and ribs, as to afford maximum strength and considerable shock absorption not present in the conventional solid beam. The hub divides the beam into a pair of downwardly sloping arms to afford a very low center of gravity while permitting sufficient oscillation for a heavy duty vehicle with unsprung axle. The degree of slope may be varied to adapt the beam to vehicles of other designs.

At each end of each beam there is an eye 49, either formed integral or welded in position, for cooperation with a plural-eyed unit 50, for support of conventional wheel-brake actuating mechanism comprising a linkage 51 and a fluid servo-motor 52 for operating the linkage. The brakes and their connections to the linkages are not shown. The motors 52 are mounted upon brackets 53 that are securely underslung from plates 54 welded or otherwise secured to the inclined bottom surfaces of the beam bodies.

There are two of the plates 54 to each beam, spaced and inclined as shown and separated by a flat plate 55 to which they are welded at their edges, the three united plates extending laterally inboard from the beam to provide a platform for an inboard bearing unit indicated in entirety by the numeral 56. This bearing can be slipped over the end of an axle sleeve 23 and onto a stepped up enlargement of the latter during initial assembly, and has a pair of integral legs 57 having feet 58 provided with bolt holes 60. The feet may be welded to the platform, but detachable bolts are preferable to facilitate assembly of a structure where there are two bearings that ultimately must be aligned.

The internal contact surface of the bearing unit 56 is grooved at 61 to receive lubricant from an oil injection inlet 62. In similar fashion, a tube 63 may be incorporated in the hub of each walking beam to supply lubricant to its sleeve bearing 35.

As shown in Figs. IV and V, each end of each beam body 34 may be equipped with an integral or welded on stop lug 64 that makes contact with one or the other I-beams 12 or 13 after predetermined oscillation of the walking beam. This is to prevent a crane platform or similar supported structure from engaging and damaging the rubber tires. The lugs are strong enough to lift the load when the frame I-beams ride upon them.

The operational functions of the various parts now should be fairly obvious, but a concise resume of the mode of assembly of the walking beam mounting may be helpful. The bearing units 56 must first be pierced by the axle sleeves 23 and moved inwardly until they are seated in ultimate working positions. After slotting of the I-beams 12, 13, the axle housing sleeves 23 (bolted to the bowl 22) are elevated into position. The plates 38 then are placed in position and the members 40 are slipped over the ends of the sleeves 23 and bolted to said plates and I-beams. Then the walking beams are slipped over the end of sleeves 23 (bearing 35 having been previously added), to dispose their platforms (54, 55) adjacent the bearing units 56 which next are bolted thereto.

Upon insertion of the axle shafts 24, and addition of the bearings 25, the plates 37 are secured to the sleeves 36. Then the dual sprockets wheels 27 are secured to the splined ends of the axle shafts. The methods of adding the sprocket chains and dual wheels are conventional and need not be explained here.

Obviously, numerous changes in general design and details of the parts may be made without departing from the spirit of the present invention. Therefore, I wish to be limited, as is customary, only by a reasonably liberal interpretation of the scope of the appended claims:

What is claimed is:

1. In a vehicle having longitudinal side frame

...of the type embodying a flat vertically
...platelike portion extending from end
...transverse member having its ends ex-
...directly through said platelike portions
...to form trunnions for reception of
...suspensions, reenforcement plates applied
...sides of said platelike portions in the re-
...said transverse member, a sleeve within
...platelike portion and surrounding the
...verse member affording a radiating flange
...each set of reenforcement plates, and
...rigidly uniting each set of plates and its
...flange to its adjacent platelike por-
...one of the side frame members.
2. ...the combination set forth in claim 1,
...sleeves snugly fitted to said transverse
...and each partially surrounded by one of
...of plates, said flanges being integral
...of said sleeves.
3. ...a multiwheel having a pair of longi-
...side frame members, an unsprung axle
...arranged transversely with its ends pro-
...through said frame members, a walking
...pivotally mounted on each end of said
...wheel units rotatably connected to and
...the ends of the walking beams, a
...rigidly carried by each walking beam
...inwardly below the frame, a pair
...bearings securely mounted upon said
...and surrounding adjacent portions of
...sleeves arranged on the housing,
...each bearing and its associated
...beam, and reenforcing means uniting
...sleeve to an adjacent portion of its asso-
...side frame member.
4. A walking beam for tandem wheeled ve-
...comprising a rigid elongated body having
...of downwardly sloping arms separated by
...hub, an underslung horizontal plat-
...secured to said body in the crotch of said
...below said hub and extending laterally
...and a bearing sleeve united to the
...portion of said platform in axial align-
...with said hub.
5. A walking beam for tandem wheeled ve-
...comprising an elongated body divided by
...central hub into a pair of down-
...sloping arms, an inclined plate secured
...bottom of each arm between said hub
...free end of the arm, a third plate disposed between said inclined plates and united
to the edges thereof, all three plates extending
laterally beyond one side of the body, a bracket
attached to the outer edge portion of the inter-
mediate plate, and a sleeve supported by said
bracket in axial alignment with said hub.

6. In a vehicle having longitudinal side frame
members in the form of I-beams, said I-beams
being notched upwardly in two transversely
aligned zones, a jackshaft assembly comprising
housing sleeves fitted into the notches, support-
ing means surrounding said sleeves within the
notches and secured to said I-beams, a plate se-
cured to each I-beam at each side of its notch,
and each of said supporting means having a
pair of integral wings closing the notches, said
wings having integral upwardly facing lugs that
are spaced apart fore and aft just sufficiently
to confine a pair of said plates.

7. In a vehicle of the class described, a pair
of longitudinal side frame members having up-
wardly formed vertical slots at transversely
aligned zones, a sleeve fitted within each slot
and having a flange rigidly secured to the asso-
ciated longitudinal frame member, a cross mem-
ber having its ends extending outwardly through
said sleeves, means secured to said frame mem-
bers to close the bottoms of the slots, and a
suspension beam pivoted on each end of said
cross member.

GUSTAVE A. COLLENDER.

REFERENCES CITED

The following references are of record in the
file of this patent:

UNITED STATES PATENTS

| Number | Name | Date |
|---|---|---|
| 1,707,535 | North | Apr. 2, 1929 |
| 1,741,425 | Masury | Dec. 31, 1929 |
| 1,850,942 | Rockwell | Mar. 22, 1932 |
| 1,887,042 | Rogers | Nov. 8, 1932 |
| 1,918,289 | Remde | July 18, 1933 |
| 1,925,536 | Judd | Sept. 5, 1933 |
| 2,124,047 | Allin | July 19, 1938 |
| 2,307,811 | Townsend | Jan. 12, 1943 |
| 2,311,252 | Reid | Feb. 16, 1943 |
| 2,322,279 | Collender | June 22, 1943 |
| 2,386,968 | Sullivan | Oct. 16, 1945 |
| 2,398,248 | Reid | Apr. 8, 1946 |